US012768755B2

(12) United States Patent
Park et al.

(10) Patent No.: US 12,768,755 B2
(45) Date of Patent: Oct. 20, 2026

(54) GAS COLLECTION DEVICE

(71) Applicant: LG ENERGY SOLUTION, LTD., Seoul (KR)

(72) Inventors: Kwangyeon Park, Daejeon (KR); Nak Hee Choi, Daejeon (KR); Dongguk Hwang, Daejeon (KR); Kyung Min Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 282 days.

(21) Appl. No.: 18/723,855

(22) PCT Filed: Jul. 19, 2023

(86) PCT No.: PCT/KR2023/010383
§ 371 (c)(1),
(2) Date: Jun. 24, 2024

(87) PCT Pub. No.: WO2024/071614
PCT Pub. Date: Apr. 4, 2024

(65) Prior Publication Data
US 2025/0067635 A1 Feb. 27, 2025

(30) Foreign Application Priority Data
Sep. 26, 2022 (KR) ........................ 10-2022-0121422

(51) Int. Cl.
*G01N 1/22* (2006.01)
*H01M 10/42* (2006.01)
(Continued)

(52) U.S. Cl.
CPC .......... *G01N 1/2226* (2013.01); *H01M 10/42* (2013.01); *H01M 10/4285* (2013.01);
(Continued)

(58) Field of Classification Search
CPC ......... G01N 1/2226; G01N 2001/2238; G01N 2001/2241; H01M 10/42; H01M 10/4285; H01M 10/52; H01M 50/3425; Y02E 60/10
See application file for complete search history.

(56) References Cited

U.S. PATENT DOCUMENTS

2017/0128998 A1 5/2017 Nakamura et al.
2020/0176833 A1 6/2020 Hwang et al.
(Continued)

FOREIGN PATENT DOCUMENTS

CN 202583139 U * 12/2012
CN 206750988 U 12/2017
(Continued)

OTHER PUBLICATIONS

CN-202583139-U, English Translation (Year: 2012).*
EP-4397953-A1, English Translation (Year: 2024).*

*Primary Examiner* — Ryan D Walsh
(74) *Attorney, Agent, or Firm* — Bryan Cave Leighton Paisner LLP

(57) ABSTRACT

Gas collection devices are provided. In certain embodiments, the gas collection devices comprise: a jig unit; a cylindrical battery; a carrier unit; a chamber body unit having an opening formed at a first end and including a battery accommodation area configured to accommodate the carrier unit; a chamber cap unit coupled to the first end of the chamber body unit and including a first side covering the opening; a first driving unit configured to move the carrier
(Continued)

unit through the opening into the battery accommodation area; a second driving unit configured to seal the first end of the chamber body unit with the chamber cap unit and configured to separate the first end of the chamber body unit from the chamber cap unit; and a gas delivery flow path connected to the chamber body unit to deliver analysis target gas diffused into the battery accommodation area to a gas analysis unit. In addition, gas collection devices are provided in which loading, unloading, punching, etc. of a battery are automated, allowing collected gas to be delivered precisely and stably to a gas analysis device.

15 Claims, 7 Drawing Sheets

(51) Int. Cl.

| | |
|---|---|
| ***H01M 10/52*** | (2006.01) |
| ***H01M 50/342*** | (2021.01) |

(52) U.S. Cl.

CPC ....... *H01M 10/52* (2013.01); *H01M 50/3425* (2021.01); *G01N 2001/2238* (2013.01); *G01N 2001/2241* (2013.01); *Y02E 60/10* (2013.01)

(56) References Cited

U.S. PATENT DOCUMENTS

| | | | | |
|---|---|---|---|---|
| 2020/0303786 | A1 | 9/2020 | Hong et al. | |
| 2024/0204350 | A1 * | 6/2024 | Kang ................ | H01M 10/4285 |

FOREIGN PATENT DOCUMENTS

| | | | | |
|---|---|---|---|---|
| EP | 4397953 | A1 * | 7/2024 | ........... G01N 1/2226 |
| JP | 2001-332312 | A | 11/2001 | |
| JP | 2021504880 | A | 2/2021 | |
| KR | 10-2016-0081394 | A | 7/2016 | |
| KR | 10-2017-0041102 | A | 4/2017 | |
| KR | 10-2018-0047280 | A | 5/2018 | |
| KR | 10-2019-0046637 | A | 5/2019 | |
| KR | 10-2019-0132906 | A | 11/2019 | |
| KR | 10-2020-0004750 | A | 1/2020 | |
| KR | 10-2020-0005983 | A | 1/2020 | |
| KR | 10-2021-0054703 | A | 5/2021 | |
| KR | 10-2268398 | B1 | 6/2021 | |
| KR | 10-2021-0125283 | A | 10/2021 | |
| KR | 10-2022-0039153 | A | 3/2022 | |

* cited by examiner

GAS COLLECTION DEVICE

CROSS-REFERENCE TO RELATED APPLICATIONS

This application is a National Phase entry pursuant to 35 U.S.C. § 371 of International Application No. PCT/KR2023/010383 filed on Jul. 19, 2023, which claims priority to and the benefit of Korean Patent Application No. KR 10-2022-0121422, filed on Sep. 26, 2022. The contents of the above-identified applications are herein incorporated by reference in their entireties.

TECHNICAL FIELD

The present disclosure relates to a gas collecting apparatus, and particularly to a gas collecting apparatus capable of accurate and stable delivery of collected gas to a gas analysis apparatus by automating loading, unloading, and punching of a battery.

BACKGROUND

In general, a secondary battery is a battery which can be used repeatedly through a discharging process in which chemical energy is converted into electrical energy and a charging process in the opposite direction to the discharging process and which includes nickel-cadmium (Ni—Cd) batteries, nickel-metal hydride (Ni-MH) batteries, lithium-metal batteries, lithium-ion (Li-ion) batteries, and lithium-ion polymer batteries. Among these secondary batteries, lithium secondary batteries having high energy density and voltage, long cycle life, and a low self-discharge rate have been commercialized and widely used.

Depending on the reaction within the lithium secondary battery, various types of gases such as hydrogen, oxygen, nitrogen, carbon monoxide, carbon dioxide, hydrocarbons of $C_nH_{2n-2}$ (n=2~5), $C_nH_{2n}$ (n=2~5), $C_nH_{2n+2}$ (n=1~5), and other organic gas species, may be generated.

In addition, the lithium secondary battery degrades while generating a large amount of gas due to electrolyte decomposition as repeated charging and discharging progresses, and this aspect appears differently depending on the design and use form of the battery. Therefore, it is important to infer a deterioration mechanism of a battery by analyzing gas generated inside the battery during a battery development process.

Therefore, it is very important to collect and accurately analyze the gas generated in the secondary battery. Various gases are generated during the operation of lithium ion batteries, and information on the composition and content of generated gases is useful for developing battery materials, optimizing battery manufacturing processes, and identifying causes of battery defects. To this end, it is important to develop a technology to collect the gas generated inside the secondary battery.

As a method for collecting gas generated inside a secondary battery, a method in which, when a battery is accommodated in a diffusion chamber with an airtight space formed therein, an opening for gas discharge is formed in the battery case, and then the gas discharged through the opening is diffused into the diffusion chamber, the diffused gas is collected in a separate gas collecting container. For high-concentration gas collection, it may be most desirable that there is no clearance between the battery and the inner space of the diffusion chamber.

Recently, batteries are used in a wide range of industrial fields, and depending on various battery application environments and conditions, performance required for batteries also varies, and batteries can be designed to various specifications.

Conventionally, in order to design various batteries, it was difficult to newly manufacture or install for each different battery model by individually using a diffusion chamber for gas collection according to the size of the battery.

In addition, the concentration of the gas delivered to an analyzer or stored in the gas collecting container varies greatly depending on the volume of the diffusion chamber, the size of the battery (material to be analyzed), and the amount of gas generated, which affects the analysis result.

In addition, since the loading and unloading of the battery and punching are performed manually, the working time for gas collection was long and human error occurred, and in particular, internal short circuit and dangerous accidents could occur during punching.

There is a need for a gas collection technology that solves the above problems and is precisely and stably automated.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure relates to a gas collecting apparatus, and provides a gas collecting apparatus capable of accurate and stable delivery of collected gas to a gas analysis apparatus by automating loading, unloading, and punching of a battery.

Technical objects to be achieved by the present disclosure are not limited to the technical objects mentioned herein, and other technical objects not mentioned will be clearly understood by those skilled in the art from the description below.

A gas collecting apparatus of the present disclosure may include:

- a jig unit;
- a cylindrical battery inside the jig unit;
- a carrier unit;
- a chamber body unit having an opening formed at a first end and including a battery accommodation area configured to accommodate the carrier unit;
- a chamber cap unit coupled to the first end of the chamber body unit and including a first side covering the opening;
- a first driving unit configured to move the carrier unit through the opening into the battery accommodation area;
- a second driving unit configured to seal the first end of the chamber body unit with the chamber cap unit and configured to separate the first end of the chamber body unit from the chamber cap unit; and
- a gas delivery flow path connected to the chamber body unit to deliver analysis target gas diffused into the battery accommodation area to a gas analysis unit.

In the gas collecting apparatus of the present disclosure, the chamber body unit may extend in a longitudinal direction of the cylindrical battery, the opening may be formed at the first end of the chamber body unit in the longitudinal direction, the carrier unit may be configured to move linearly in the longitudinal direction using the first driving unit, a punching needle may be located on the first side of the chamber cap unit facing the cylindrical battery, and the first driving unit may be configured to move the carrier unit toward the chamber cap unit to form a perforated hole in the cylindrical battery using the punching needle.

In the gas collecting apparatus of the present disclosure, the jig unit may be a cylindrical shape extending in the longitudinal direction, the cylindrical battery may be located inside the jig unit so that an outer circumferential surface of the cylindrical battery is in contact with an inner circumferential surface of the jig unit, and a needle insertion hole may be located at a first end of the jig unit in the longitudinal direction.

In the gas collecting apparatus of the present disclosure, an electrolyte storage groove may be located on the inner circumferential surface of the jig unit, and the electrolyte storage groove may be adjacent to the first end of the jig unit comprising the needle insertion hole.

In the gas collecting apparatus may further comprise, a plurality of jig units, each jig unit including a cylindrical battery, and the gas collecting apparatus may further include: a battery storage unit in which the plurality of jig units are located; and a battery delivery unit configured to sequentially deliver the plurality of jig units from the battery storage unit to the carrier unit.

In the gas collecting apparatus of the present disclosure, a first cylindrical battery may be in at least one of the plurality of jig units and a second cylindrical battery may be in at least one of the plurality of jig units, wherein the first cylindrical battery and the second cylindrical battery have different outer diameters, and the plurality of jig units each have a same outer diameter.

In the gas collecting apparatus of the present disclosure, the battery storage unit may include a battery storage track in which the plurality of jig units are aligned, a battery discharge hole located at a first end of the battery storage track to sequentially discharge the plurality of jig units, and an elastic door mounted on an edge of an inlet of the battery discharge hole to prevent the plurality of jig units from exiting the battery storage unit with a restoring force, wherein the carrier unit may be configured to move between an outside of the chamber body unit and the battery accommodation area using the first driving unit, and the inlet of the battery discharge hole may be spaced apart from the carrier unit by a predetermined distance so as to face the carrier unit, wherein the carrier unit is located outside of the chamber body unit.

In the gas collecting apparatus of the present disclosure, the battery delivery unit may include a gripper configured to grip one of the plurality of jig units exposed from the battery discharge hole, a rotating member having a first end to which the gripper is mounted and extending in a second direction perpendicular to the longitudinal direction, and a shaft member which is located between the battery discharge hole and the carrier unit, wherein the carrier unit is located outside of the chamber body unit and extending in the longitudinal direction, wherein the shaft member may be coupled to the rotating member, and the rotating member may be configured to rotate around the shaft member.

In the gas collecting apparatus of the present disclosure, the first driving unit may include a power transmission bar extending in the longitudinal direction and penetrating a second end of the chamber body unit in the longitudinal direction such that a first end of the power transmission bar is inside the chamber body unit, a moving member, wherein the carrier unit is coupled to one side of the moving member and the first end of the power transmission bar is coupled to a second side of the moving member, a first fixing frame to which the chamber body unit is fixed, a first moving frame to which the power transmission bar is fixed and configured to move linearly in the longitudinal direction based on the first fixing frame, a shaft screwed into the first moving frame and coupled to the first fixing frame and configured for idling, and an an electric motor configured to rotate the shaft.

In the gas collecting apparatus of the present disclosure, a sealing cover surrounding the power transmission bar may be located inside the chamber body unit, and a first end of the sealing cover may be fused to the second side of the moving member and a second end of the sealing cover may be fused to an inner wall of the second end of the chamber body unit.

In the gas collecting apparatus of the present disclosure, the sealing cover may be in a bellows form.

In the gas collecting apparatus of the present disclosure, the second driving unit may include a second moving frame to which the first fixing frame is fixed, a second fixing frame to which the chamber cap unit is fixed, and a pneumatic actuator configured to move the second moving frame in the longitudinal direction based on the second fixing frame.

The gas collecting apparatus of the present disclosure may further include a pressure sensor unit connected to the gas delivery flow path, wherein the pressure sensor unit may be configured to measure a pressure of the battery accommodation area.

The gas collecting apparatus of the present disclosure may further include a controller configured to control the first driving unit, wherein the controller may be controlled based on a pressure value measurement output from the pressure sensor unit.

The gas collecting apparatus of the present disclosure may further include a manifold located in the gas delivery flow path;

a dilution tank connected to the manifold by a dilution tank flow path;

a vacuum pump connected to the manifold by a vacuum pump flow path;

a first valve configured to open or block a first flow path connecting the manifold and the chamber body unit;

a second valve configured to open or block a second flow path connecting the manifold and the gas analysis unit;

a third valve configured to open or block the dilution tank flow path connecting the manifold and the dilution tank; and a fourth valve configured to open or block the vacuum pump flow path connecting the manifold and the vacuum pump, wherein the controller may be configured to control the first valve, the second valve, the third valve, and the fourth valve based on a signal transmitted by the gas analysis unit.

A gas collecting apparatus of the present disclosure may be capable of precise and rapid gas collection by automating replacement of a jig unit, loading and unloading of a battery, and punching.

The gas collecting apparatus of the present disclosure may determine whether punching is completed by measuring movement of a punching needle and an amount of pressure change, thereby preventing accidents such as an internal short circuit of the battery and improving safety during gas collection.

BRIEF DESCRIPTION OF THE DRAWINGS

The accompanying drawings illustrate various embodiments of the present disclosure and together with the foregoing disclosure, serve to provide further understanding of the technical features of the present disclosure, and thus, the present disclosure is not construed as being limited to the drawings.

DETAILED DESCRIPTION

Figure 1:
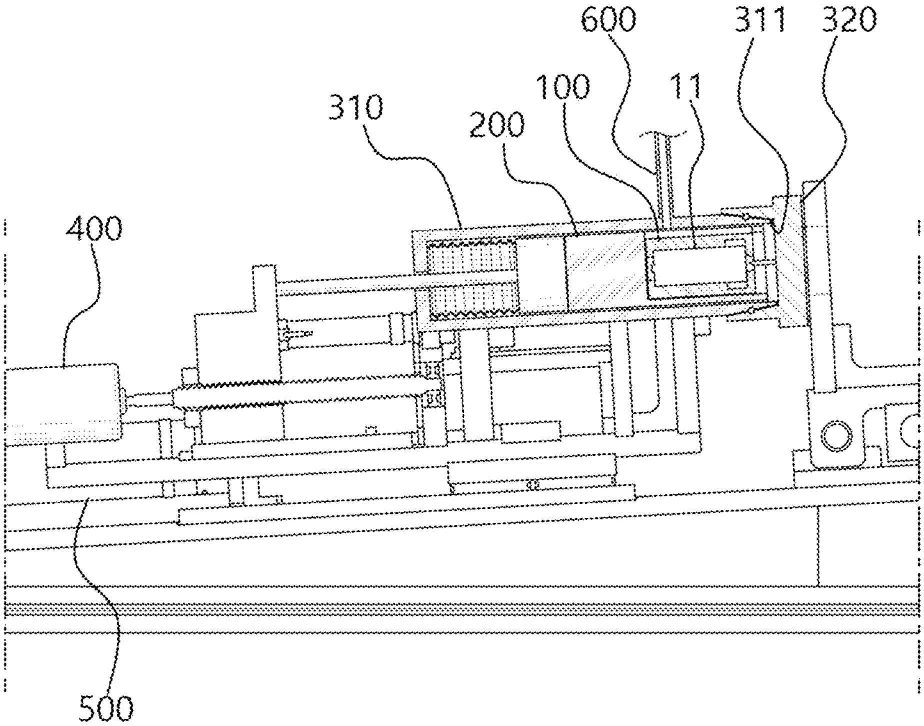
FIG. 1 is a cross-sectional view illustrating a gas collecting apparatus according to an embodiment of the present disclosure.

A gas collecting apparatus of the present disclosure may include a jig unit in which a cylindrical battery is mounted;

a carrier unit on which the jig unit in which the cylindrical battery is mounted is mounted;

a chamber body unit provided with a battery accommodating space in which the carrier unit is accommodated inside and having an opening formed at one end;

a chamber cap unit coupled to the one end of the chamber body unit so that one side covers the opening;

a first driving unit configured to move the carrier unit into the battery accommodating space through the opening;

a second driving unit configured to closely contact or separate the one end of the chamber body unit and the one side of the chamber cap unit each other; and a gas delivery flow path connected to the chamber body unit to deliver analysis target gas diffused in the battery accommodating space to a gas analysis unit.

In the gas collecting apparatus of the present disclosure, when a longitudinal direction of the cylindrical battery is referred to as a first direction, the chamber body unit may extend in the first direction, the opening may be formed at the one end of the chamber body unit in the first direction, the carrier unit may move linearly in the first direction by the first driving unit, a punching needle may be provided on the one side of the chamber cap unit at a location facing the cylindrical battery, and the first driving unit may move the carrier unit toward the chamber cap unit to form a perforated hole in the cylindrical battery by the punching needle.

In the gas collecting apparatus of the present disclosure, the jig unit may be provided in a cylindrical shape extending in the first direction, the cylindrical battery may be mounted in the jig unit so that an outer circumferential surface of the cylindrical battery is in close contact with an inner circumferential surface of the jig unit, and a needle insertion hole may be formed at one end in the first direction of the jig unit.

In the gas collecting apparatus of the present disclosure, an electrolyte storage groove may be formed on the inner circumferential surface of the jig unit, and the electrolyte storage groove may be located adjacent to a side wall where the needle insertion hole is located in an inner space of the jig unit.

In the gas collecting apparatus of the present disclosure, a plurality of the jig units may be provided, and one cylindrical battery may be mounted in each of the plurality of jig units, and the gas collecting apparatus may further include: a battery storage unit in which the plurality of jig units are accommodated; and a battery delivery unit configured to sequentially deliver the plurality of jig units from the battery storage unit to the carrier unit one by one.

In the gas collecting apparatus of the present disclosure, a first cylindrical battery may be mounted in a part of the plurality of jig units and a second cylindrical battery may be mounted in another part of the plurality of jig units, wherein the first cylindrical battery and the second cylindrical battery may be formed with different outer diameters, and the plurality of jig units may be all provided with the same outer diameter.

In the gas collecting apparatus of the present disclosure, the battery storage unit may include a battery storage track in which the plurality of jig units are stored in an aligned state, a battery discharge hole formed at one end of the battery storage track to discharge the plurality of jig units one by one, and an elastic door mounted on an edge of an inlet of the battery discharge hole to prevent the plurality of jig units from being separated from the battery storage unit with a restoring force, wherein the carrier unit may move between an outer space of the chamber body unit and the battery accommodating space by the first driving unit, and the inlet of the battery discharge hole may be provided at a location spaced apart from the carrier unit by a predetermined distance so as to face the carrier unit in a state of being located in the outer space of the chamber body unit.

In the gas collecting apparatus of the present disclosure, the battery delivery unit may include a gripper configured to grip one jig unit exposed to the battery discharge hole among the plurality of jig units, a rotating member having one end to which the gripper is mounted and extending in a second direction perpendicular to the first direction, and a shaft member which is located between the battery discharge hole and the carrier unit in the state of being located in the outer space of the chamber body unit and extends in the first direction, wherein the shaft member may be coupled with the rotating member, and the rotating member may rotate with respect to the shaft member serving as a rotation shaft.

In the gas collecting apparatus of the present disclosure, the first driving unit may include a power transmission bar extending in the first direction and penetrating the other end of the chamber body unit in the first direction to have one end inserted inside the chamber body unit, a moving member, wherein the carrier unit is coupled to one side of the moving member and the one end of the power transmission bar is coupled to the other side of the moving member, a first fixing frame to which the chamber body unit is fixed, a first moving frame to which the power transmission bar is fixed and linearly moving in the first direction based on the first fixing frame, a shaft screwed with the first moving frame and coupled to the first fixing frame to be capable of idling, and an electric motor configured to rotate the first shaft.

In the gas collecting apparatus of the present disclosure, a sealing cover surrounding the power transmission bar may be provided inside the chamber body unit, and one end of the sealing cover may be fused to the other side of the moving member and the other end of the sealing cover may be fused to an inner wall of the other end side of the chamber body unit.

In the gas collecting apparatus of the present disclosure, the sealing cover may be provided in a form of bellows.

In the gas collecting apparatus of the present disclosure, the second driving unit may include a second moving frame to which the first fixing frame is fixed, a second fixing frame to which the chamber cap unit is fixed, and a pneumatic actuator configured to move the second moving frame in the first direction based on the second fixing frame.

The gas collecting apparatus of the present disclosure may further include a pressure sensor unit connected to the gas delivery flow path, wherein the pressure sensor unit may be configured to measure a pressure of the battery accommodating space.

The gas collecting apparatus of the present disclosure may further include a controller configured to control the first driving unit, wherein the controller may be controlled based on a pressure measured value output from the pressure sensor unit.

The gas collecting apparatus of the present disclosure may further include

- a manifold provided in the gas delivery flow path;
- a dilution tank connected to the manifold by a flow path;
- a vacuum pump connected to the manifold by a flow path;
- a first valve configured to open or block a flow path connecting the manifold and the body unit;
- a second valve configured to open or block a flow path connecting the manifold and the gas analysis unit;
- a third valve configured to open or block the flow path connecting the manifold and the dilution tank; and
- a fourth valve configured to open or block the flow path connecting the manifold and the vacuum tank,
- wherein the controller may be configured to control the first valve, the second valve, the third valve, and the fourth valve based on a signal transmitted to the gas analysis unit.

Hereinafter, embodiments according to the present disclosure will be described in detail with reference to the accompanying drawings. In this process, the size or shape of the components shown in the drawings may be exaggerated for clarity and convenience of explanation. In addition, terms specifically defined in consideration of the configuration and operation of the present disclosure may vary according to the intentions or customs of users and operators. Definitions of these terms should be made based on the content throughout this specification.

In the description of the present disclosure, it should be noted that the orientation or positional relationship indicated by the terms "center", "upper", "lower", "left", "right", "vertical", "horizontal", "inner side", "outer side", "one surface", "other surface" is based on the orientation or positional relationship shown in the drawing or the orientation or positional relationship normally arranged when using the product of the present disclosure, and it is intended only for explanation and brief description of the present disclosure, and is not to be construed as limiting the present disclosure as it does not suggest or imply that the device or element shown must necessarily be configured or operated in a specific orientation with a specific orientation.

Figure 2:
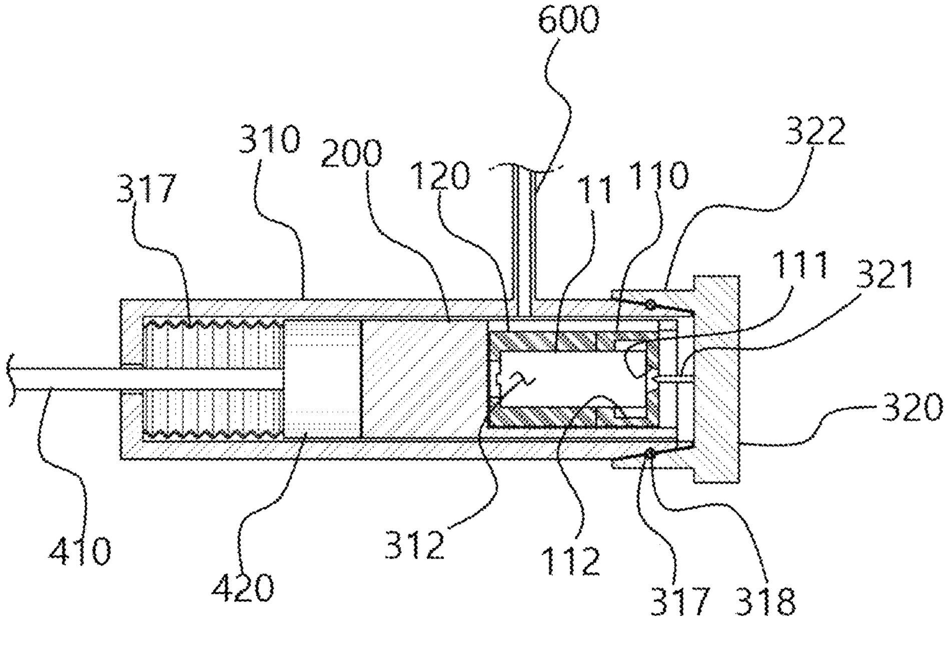
FIG. 2 is an enlarged cross-sectional view of a local region of FIG. 1.
Figure 3A:
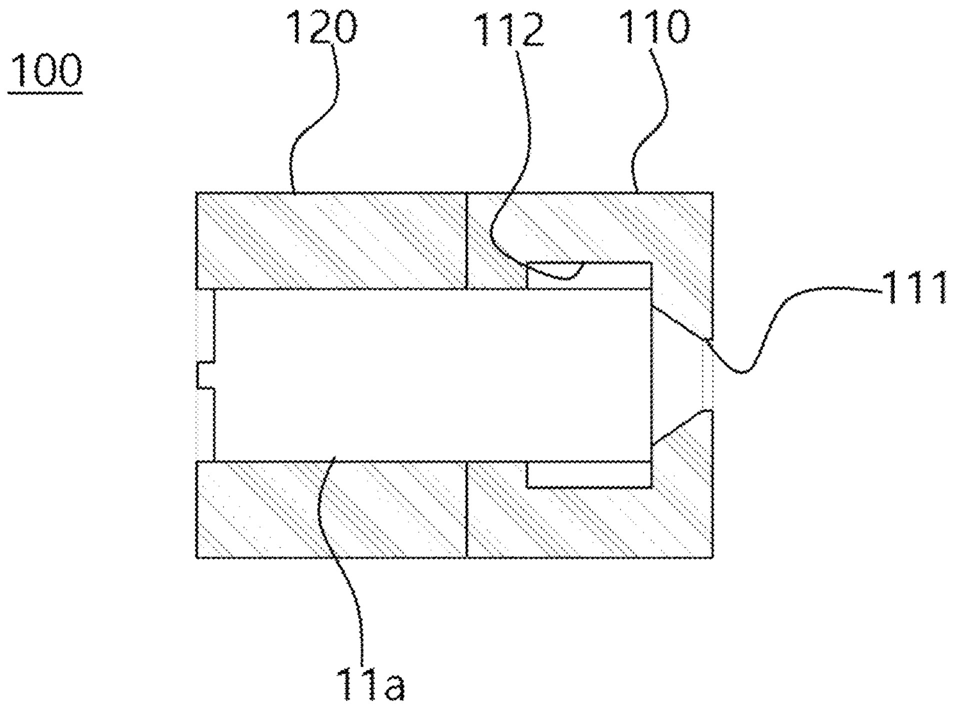
FIG. 3A is a cross-sectional view illustrating a jig unit.
Figure 3B:
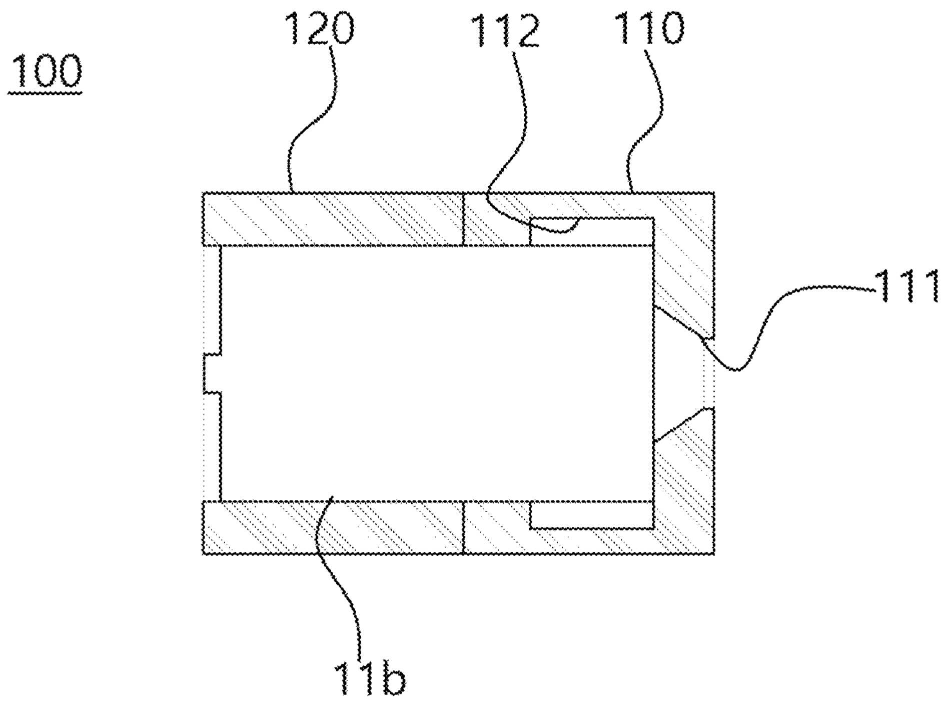
FIG. 3B is cross-sectional view illustrating a jig unit.
Figure 4:
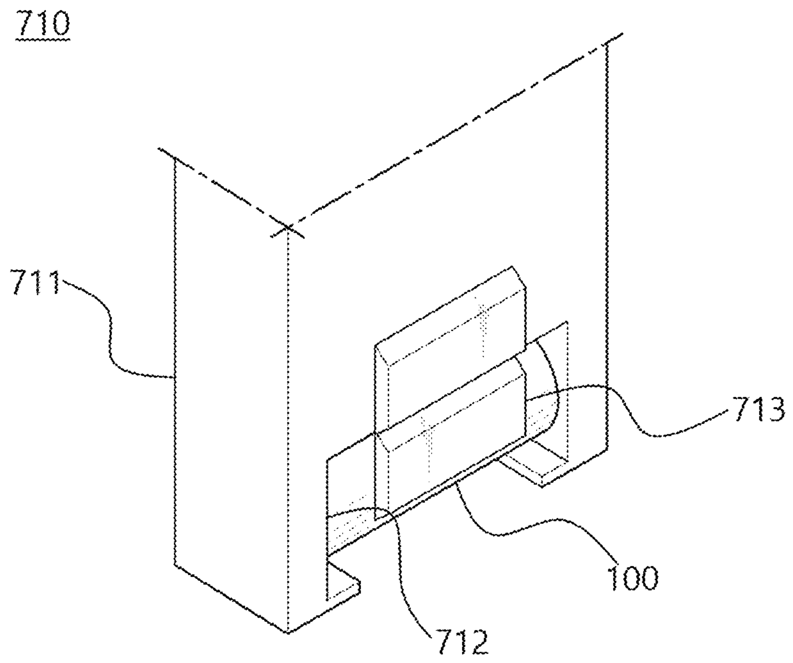
FIG. 4 is a perspective view illustrating a battery storage unit.
Figure 5:
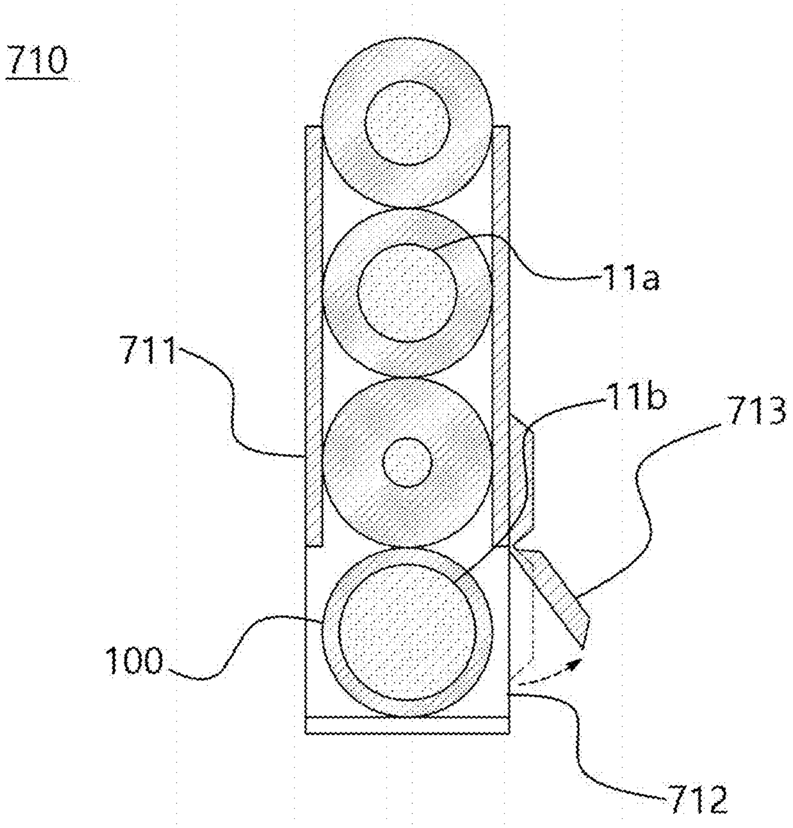
FIG. 5 is a cross-sectional view illustrating a battery storage unit.
Figure 6:
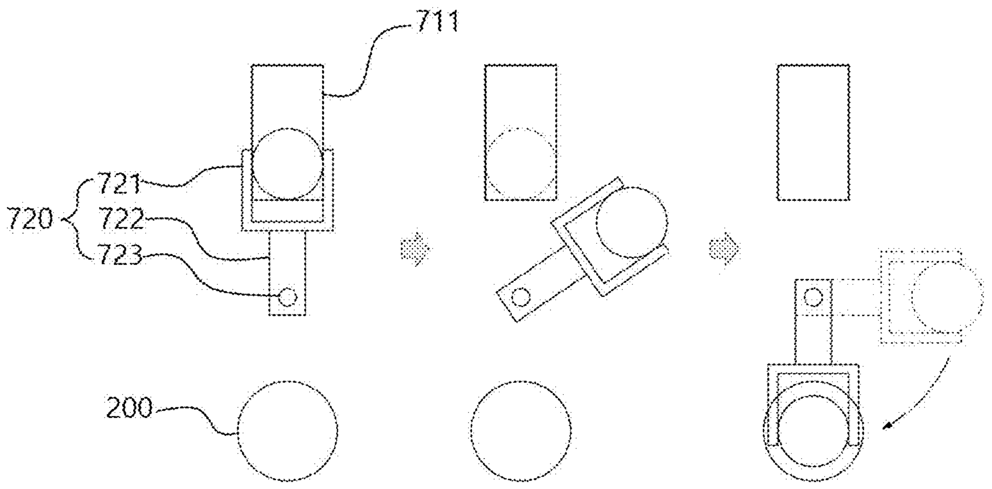
FIG. 6 is a diagram illustrating movement of a jig unit.
Figure 7:
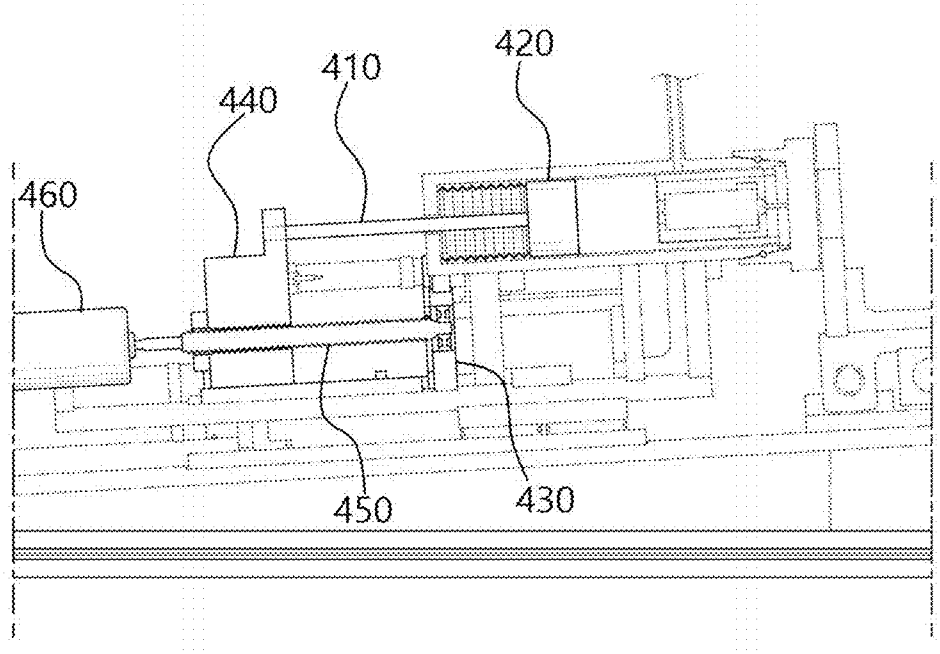
FIG. 7 is a cross-sectional view illustrating a first driving unit.
Figure 8:
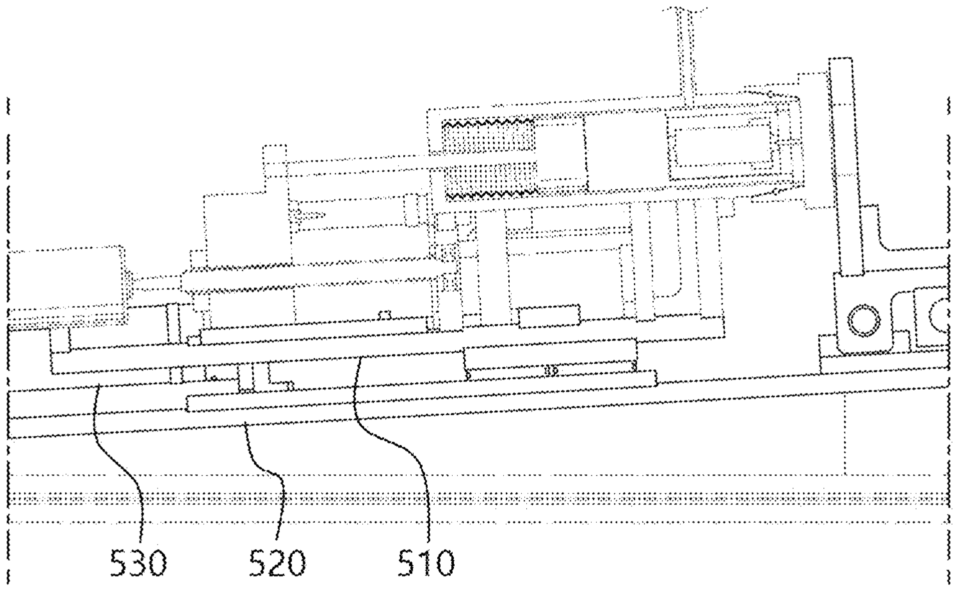
FIG. 8 is a cross-sectional view illustrating a second driving unit.

FIG. 1 is a cross-sectional view illustrating a gas collecting apparatus according to the present disclosure. FIG. 2 is an enlarged cross-sectional view of a local region of FIG. 1. FIGS. 3A and 3B are cross-sectional views illustrating a jig unit 100. FIG. 4 is a perspective view illustrating a battery storage unit 710. FIG. 5 is a cross-sectional view illustrating a battery storage unit 710. FIG. 6 is a diagram illustrating movement of the jig unit 100. FIG. 7 is a cross-sectional view illustrating a first driving unit. FIG. 8 is a cross-sectional view illustrating a second driving unit 500.

The gas collecting apparatus of the present disclosure is specialized for collecting gas generated inside the cylindrical battery 11, and may automate most processes for gas collection, such as loading of the battery, perforating of the battery, gas collection, gas delivery, and unloading of the battery.

Since the gas collecting apparatus of the present disclosure skips the process of storing the gas generated in the battery in a separate collection container and directly delivers it to the gas analysis unit, it may be capable of real-time analysis as well as preventing phenomena such as deterioration, leakage, and phase change of gas.

Since the gas collecting apparatus of the present disclosure provides almost the same gas diffusion space for the cylindrical battery 11 of various specifications, it may be advantageous for quantitative analysis.

The cylindrical battery 11, which is a gas collection target of the gas collecting apparatus of the present disclosure, may accommodate an electrode assembly inside a cylindrical housing made of a rigid material.

The gas collecting apparatus of the present disclosure may extract gas from the cylindrical battery 11 with an automated system and deliver it to the gas analysis unit. The gas analysis unit which is to be a gas delivery target may be, for example, a GC-MS device.

As shown in FIG. 1, the gas collecting apparatus of the present disclosure may include a jig unit 100 in which a cylindrical battery 11 is mounted;

- a carrier unit 200 on which the jig unit 100 in which the cylindrical battery 11 is mounted is mounted;
- a chamber body unit 310 provided with a battery accommodating space 312 in which the carrier unit 200 is accommodated inside and having an opening 311 formed at one end;
- a chamber cap unit 320 coupled to the one end of the chamber body unit 310 so that one side covers the opening 311;
- a first driving unit configured to move the carrier unit 200 into the battery accommodating space 312 through the opening 311;
- a second driving unit 500 configured to closely contact or separate the one end of the chamber body unit 310 and the one side of the chamber cap unit 320 each other; and
- a gas delivery flow path 600 connected to the chamber body unit 310 to deliver analysis target gas diffused in the battery accommodating space 312 to a gas analysis unit.

As shown in FIG. 2, in the gas collecting apparatus of the present disclosure, when a longitudinal direction of the cylindrical battery 11 is referred to as a first direction, the chamber body unit 310 may extend in the first direction, the opening 311 may be formed at the one end of the chamber body unit 310 in the first direction, and the carrier unit 200 may move linearly in the first direction by the first driving unit. For example, the chamber body unit 310 may be provided in a cylindrical shape with the first direction as a central axis. The first direction may be perpendicular to the direction of gravity or a direction forming an acute angle with the direction of gravity. When the first direction forms an acute angle with the direction of gravity, one end of the chamber body unit 310 where the opening 311 is formed may be located at a higher location than the other end with respect to the direction of gravity. In other words, in the cylindrical battery 11, the perforated end is formed higher than the non-perforated end, so that the chamber cap unit 320 and the punching needle 321 located in the chamber cap unit 320 are prevented from being contaminated with the electrolyte. In addition, as described above, the first direction is formed to be inclined with respect to the direction of gravity (not perpendicular to the direction of gravity), so that even if the electrolyte leaks from the cylindrical battery 11, the leaked electrolyte is stored in the electrolyte storage groove 112 of the jig unit 100 to be described later, and the leaked electrolyte can be removed from the apparatus together when the jig unit 100 is unloaded.

The carrier unit 200 may be made of a chemical resistant insulating material.

The inner space of the chamber body unit 310 may also be provided in a cylindrical shape with the first direction as a central axis. The opening 311 may be formed in a circular shape, and the center of the opening 311 and the central axis of the inner space of the chamber body unit 310 may coincide.

The outer circumferential surface of the chamber body unit 310 at one end side of the chamber body unit 310 may be formed in a tapered shape in which the outer diameter decreases as it approaches one end of the chamber body unit 310. A ring-shaped groove 318 into which a sealing member 317 such as an O-ring can be inserted may be formed in a region provided in a tapered shape among the outer circumferential surface of the chamber body unit 310.

A punching needle 321 may be provided on the one side of the chamber cap unit 320 at a location facing the cylindrical battery 11, and the first driving unit may move the carrier unit 200 toward the chamber cap unit 320 side to form a perforated hole in the cylindrical battery 11 by the punching needle 321.

The chamber cap unit 320 may be provided in a disk shape. The punching needle 321 may be located at the center of the chamber cap unit 320, and the center of the chamber cap unit 320 and the center of the opening 311 may be located on a straight line coincident with the central axis of the cylindrical space formed inside the chamber body unit 310.

On one side of the chamber cap unit 320, a cylindrical sealing frame 322 into which one end of the chamber body unit 310 can be inserted may be formed. The inner circumferential surface of the sealing frame 322 may be provided in a tapered shape in which the inner diameter increases as it approaches the chamber body unit 310. The sealing frame 322 may cover the tapered region of the outer circumferential surface of the chamber body unit 310 when the chamber cap unit 320 and the chamber body unit 310 are coupled.

As shown in FIG. 2, the jig unit 100 may be provided in a cylindrical shape extending in the first direction, the cylindrical battery 11 may be mounted in the jig unit 100 so that an outer circumferential surface of the cylindrical battery 11 is in close contact with an inner circumferential surface of the jig unit 100, and a needle insertion hole 111 may be formed at one end in the first direction of the jig unit 100.

The needle insertion hole 111 may also be located on a straight line where the center of the chamber cap unit 320 and the center of the opening 311 are located.

The jig unit 100 may include a first jig 110 covering one end of the cylindrical battery 11 and a second jig 120 covering the other end of the cylindrical battery 11. In other words, the jig unit 100 may be formed of two jigs respectively inserted into both ends of the cylindrical battery 11.

An electrolyte storage groove 112 may be formed on the inner circumferential surface of the jig unit 100, and the electrolyte storage groove 112 may be located adjacent to a side wall where the needle insertion hole 111 is located in an inner space of the jig unit 100. The electrolyte storage groove 112 may be formed in a ring shape along the inner circumferential surface of the jig unit 100.

As shown in FIGS. 3A and 3B, the width and depth of the electrolyte storage groove 112 may be determined in consideration of the electrolyte injected into the cylindrical battery 11 mounted in the jig unit 100. The depth of the electrolyte storage groove 112 may be formed to be 10% to 30% of the outer diameter of the cylindrical battery 11. More preferably, the depth of the electrolyte storage groove 112 may be formed to be 15% to 25% of the outer diameter of the cylindrical battery 11. For example, the depth of the electrolyte storage groove 112 may be formed to be 20% of the outer diameter of the cylindrical battery 11.

In the gas collecting apparatus of the present disclosure, a plurality of the jig units 100 may be provided, and one cylindrical battery 11 may be mounted in each of the plurality of jig units 100. Specifically, the gas collecting apparatus of the present disclosure may sequentially collect gas with an automated system for a plurality of cylindrical batteries 11, and at this time, the jig unit 100 may be individually assigned to each cylindrical battery 11.

As shown in FIGS. 4 to 6, for automated battery input, the gas collecting apparatus of the present disclosure may further include a battery storage unit 710 in which the plurality of jig units 100 are accommodated; and a battery delivery unit 720 configured to sequentially deliver the plurality of jig units from the battery storage unit to the carrier unit 200 one by one.

As shown in FIG. 5, a first cylindrical battery 11*a* may be mounted in a part of the plurality of jig units 100 and a second cylindrical battery 11*b* may be mounted in another part of the plurality of jig units 100, and the first cylindrical battery 11*a* and the second cylindrical battery 11*b* are formed with different outer diameters and the plurality of jig units 100 may be all provided with the same outer diameter. In other words, the gas collecting apparatus of the present disclosure may include various types of jig units 100 having inner spaces corresponding to cylindrical batteries 11 of various specifications, and by having a plurality of jig units 100 having different shapes and sizes of inner spaces have the same external shape, the entire gas collecting process can be equally applied to cylindrical batteries 11 of various specifications.

As shown in FIGS. 4 and 5, the battery storage unit 710 may include a battery storage track 711 in which the plurality of jig units 100 are stored in an aligned state, a battery discharge hole 712 formed at one end of the battery storage track 711 to discharge the plurality of jig units 100 one by one, and an elastic door 713 mounted on an edge of an inlet of the battery discharge hole 712 to prevent the plurality of jig units 100 from being separated from the battery storage unit 710 with a restoring force.

In the gas collecting apparatus of the present disclosure, the carrier unit 200 moves between an outer space of the chamber body unit 310 and the battery accommodating space 312 by the first driving unit, wherein the inlet of the battery discharge hole 712 may be provided at a location spaced apart from the carrier unit 200 by a predetermined distance so as to face the carrier unit 200 in a state of being located in the outer space of the chamber body unit 310. In other words, in a state where the carrier unit 200 is taken out from the chamber body unit 310, the carrier unit 200 and the battery discharge hole 712 may be disposed at locations spaced apart from each other by a predetermined distance in a second direction perpendicular to the first direction.

As shown in FIG. 6, the battery delivery unit 720 may include a gripper 721 configured to grip one jig unit 100 exposed to the battery discharge hole 712 among the plurality of jig units 100, a rotating member 722 having one end to which the gripper 721 is mounted and extending in a second direction perpendicular to the first direction, and a shaft member 723 which is located between the battery discharge hole 712 and the carrier unit 200 in the state of being located in the outer space of the chamber body unit 310 and extends in the first direction, wherein the shaft member 723 may be coupled with the rotating member 722, and the rotating member 722 may rotate with respect to the shaft member 723 serving as a rotation shaft.

As the shaft member 723 rotates, the gripper 721 applies a force greater than the restoring force by which the elastic door 713 fixes the jig unit 100 to the jig unit 100 to take the jig unit 100 out of the battery storage track 711, and the jig unit 100 may be seated on the carrier unit 200 while the shaft member 723 continues to rotate.

As shown in FIG. 7, the first driving unit may include a power transmission bar 410 extending in the first direction and penetrating the other end of the chamber body unit 310 in the first direction to have one end inserted inside the chamber body unit 310, a moving member 420, the carrier unit 200 being coupled to one side of the moving member 420 and the one end of the power transmission bar 410 being coupled to the other side of the moving member 420, a first fixing frame 430 to which the chamber body unit 310 is fixed, a first moving frame 440 to which the power transmission bar 410 is fixed and linearly moving in the first direction based on the first fixing frame 430, a shaft 450 screwed with the first moving frame 440 and coupled to the first fixing frame 430 to be capable of idling, and an electric motor 460 configured to rotate the first shaft 450.

As described above, the first driving unit is provided in a structure that converts the rotational force of the electric motor 460 into linear motion, so that the distance between the cylindrical battery 11 and the punching needle 321 can be precisely controlled. In addition, an encoder is mounted on the electric motor 460, and the measured distance between the cylindrical battery 11 and the punching needle 321 can be input as a signal of the encoder to the controller that controls the first driving unit.

A sealing cover 317 surrounding the power transmission bar 410 may be provided inside the chamber body unit 310, and one end of the sealing cover 317 may be fused to the other side of the moving member 420 and the other end of the sealing cover 317 may be fused to an inner wall of the other end side of the chamber body unit 310.

The moving member 420 is of a chemical-resistant metal material and may be coupled by welding a sealing cover 317 made of a metal material.

The inner space of the chamber body unit 310 is divided into two spaces around the moving member 420, and a space facing one side of the moving member 420 may be the battery accommodating space 312.

The sealing cover 317 may be provided in a form of a bellows. More specifically, the sealing cover 317 may have a form of a bellows made of metal.

As shown in FIG. 8, the second driving unit 500 may include a second moving frame 510 to which the first fixing frame 430 is fixed, a second fixing frame 520 to which the chamber cap unit 320 is fixed, and a pneumatic actuator 530 configured to move the second moving frame 510 in the first direction based on the second fixing frame 520. In other words, the second driving unit 500 may move the entire chamber body unit 310. The second driving unit 500 may enhance airtightness by maintaining continuous pressurization during gas collection by coupling the chamber body unit 310 and the chamber cap unit 320 with the power of the pneumatic actuator 530.

The gas collecting apparatus of the present disclosure may further include an air spraying unit (not shown) located to face the punching needle 321 provided in the chamber cap unit 320 and configured to spray high-pressure gas toward the punching needle 321. Using the second driving unit 500, the chamber body unit 310 can be completely retracted so as not to be located on an imaginary straight line connecting the punching needle 321 and the nozzle of the air spraying unit. When the chamber body unit 310 is completely separated from the chamber cap unit 320 by the second driving unit 500, the punching needle 321 may be cleaned by spraying high-pressure gas toward the punching needle 321 from a nozzle of the air spraying unit. The high-pressure gas sprayed by the air spraying unit may be high-pressure air or an inert gas as a gas for purging. The air spraying unit may clean the chamber cap unit 320 contaminated with electrolyte by spraying high-pressure gas toward the chamber cap unit 320 for several seconds.

The gas collecting apparatus of the present disclosure may further include a pressure sensor unit connected to the gas delivery flow path 600, wherein the pressure sensor unit may be configured to measure a pressure of the battery accommodating space 312.

The gas collecting apparatus of the present disclosure may further include a controller configured to control the first driving unit, wherein the controller may be controlled based on a pressure measured value output from the pressure sensor unit. Specifically, when the pressure measured by the pressure sensor unit is equal to or greater than the set pressure value, the controller may drive the first driving unit to cause the punching needle 321 to retreat from the cylindrical battery 11. The set pressure value may be determined in consideration of the type of cylindrical battery 11, charge/discharge state, number of cycles, temperature, and the like.

The gas collecting apparatus of the present disclosure may further include

- a manifold provided in the gas delivery flow path 600;
- a dilution tank connected to the manifold by a flow path;
- a vacuum pump connected to the manifold by a flow path;
- a first valve configured to open or block a flow path connecting the manifold and the body unit;
- a second valve configured to open or block a flow path connecting the manifold and the gas analysis unit;
- a third valve configured to open or block the flow path connecting the manifold and the dilution tank; and
- a fourth valve configured to open or block the flow path connecting the manifold and the vacuum tank.

The controller may be configured to control the first valve, the second valve, the third valve, and the fourth valve based on a signal transmitted by the gas analysis unit. Specifically, each valve may be controlled according to a process sequence by receiving information on a gas analysis process.

Although embodiments according to the present disclosure have been described above, they are only illustrative and those skilled in the art will understand that various modifications and embodiments of equivalent range are possible therefrom. Therefore, the true technical protection scope of the present disclosure should be defined by the following claims.

<Explanation of Symbols> 11 . . . cylindrical battery, 11*a* . . . First cylindrical battery, 11*b* . . . Second cylindrical battery, 100 . . . Jig unit, 110 . . . First jig, 111 . . . Needle insertion hole, 112 . . . Electrolyte storage groove,

120 . . . Second jig, 200 . . . Carrier unit, 310 . . . Chamber body unit, 311 . . . Opening, 312 . . . Battery accommodating space, 317 . . . Sealing cover, 320 . . . Chamber cap unit, 321 . . . Punching needle, 322 . . . Sealing frame, 400 . . . First driving, 410 . . . Power transmission bar, 420 . . . Moving member, 430 . . . First fixing frame, 440 . . . First moving frame, 450 . . . Shaft, 460 . . . Electric motor, 500 . . . Second driving unit, 510 . . . Second moving frame, 520 . . . Second fixing frame, 530 . . . Pneumatic actuator, 600 . . . Gas delivery flow path, 710 . . . Battery storage unit, 711 . . . Battery storage track, 712 . . . Battery discharge hole, 713 . . . Elastic door, 720 . . . Battery delivery unit, 721 . . . Gripper, 722 . . . Rotating member, 723 . . . Shaft member A gas collecting apparatus of the present disclosure may be capable of precise and rapid gas collection by automating the replacement of a jig unit, loading and unloading of a battery, and punching.

The gas collecting apparatus of the present disclosure may determine whether punching is completed by measuring the movement of the punching needle and the amount of pressure change, thereby preventing accidents such as an internal short circuit of the battery and improving safety during gas collection.

The invention claimed is:

1. A gas collecting apparatus comprising:
- a jig unit;
- a cylindrical battery inside the jig unit;
- a carrier unit;
- a chamber body unit having an opening formed at a first end and including a battery accommodation area configured to accommodate the carrier unit;
- a chamber cap unit coupled to the first end of the chamber body unit and including a first side covering the opening;
- a first driving unit configured to move the carrier unit through the opening into the battery accommodation area;
- a second driving unit-configured to seal the first end of the chamber body unit with the chamber cap unit and configured to separate the first end of the chamber body unit from the chamber cap unit; and
- a gas delivery flow path connected to the chamber body unit to deliver analysis target gas diffused into the battery accommodation area to a gas analysis unit.

2. The gas collecting apparatus of claim 1, wherein,
- the chamber body unit extends in a longitudinal direction of the cylindrical battery,
- the opening is formed at the first end of the chamber body unit in the longitudinal direction,
- the carrier unit is configured to move linearly in the longitudinal direction using the first driving unit,
- a punching needle is located on the first side of the chamber cap unit facing the cylindrical battery, and
- the first driving unit is configured to moves the carrier unit toward the chamber cap unit to form a perforated hole in the cylindrical battery using the punching needle.

3. The gas collecting apparatus of claim 2, wherein the jig unit has a cylindrical shape extending in the longitudinal direction,
- the cylindrical battery is located inside the jig unit so that an outer circumferential surface of the cylindrical battery is in contact with an inner circumferential surface of the jig unit, and
- a needle insertion hole is located at a first end of the jig unit in the longitudinal direction.

4. The gas collecting apparatus of claim 3, wherein an electrolyte storage groove is located on the inner circumferential surface of the jig unit, and
- the electrolyte storage groove is adjacent to the first end of the jig unit comprising the needle insertion hole.

5. The gas collecting apparatus of claim 3, further comprising:
- a plurality of jig units, each jig unit including a cylindrical battery;
- a battery storage unit in which the plurality of jig units are located; and
- a battery delivery unit configured to sequentially deliver the plurality of jig units from the battery storage unit to the carrier unit.

6. The gas collecting apparatus of claim 5, wherein a first cylindrical battery is in at least one of the plurality of jig units, and
- a second cylindrical battery is in at least one of the plurality of jig units, and
- wherein the first cylindrical battery and the second cylindrical battery have different outer diameters, and
- the plurality of jig units each have a same outer diameter.

7. The gas collecting apparatus of claim 5, wherein the battery storage unit comprises:
- a battery storage track in which the plurality of jig units are aligned;
- a battery discharge hole located at a first end of the battery storage track to sequentially discharge the plurality of jig units; and
- an elastic door mounted on an edge of an inlet of the battery discharge hole to prevent the plurality of jig units from exiting the battery storage unit with a restoring force,
- wherein the carrier unit is configured to move between an outside of the chamber body unit and the battery accommodation area using the first driving unit, and
- the inlet of the battery discharge hole is spaced apart from the carrier unit by a predetermined distance so as to face the carrier unit, wherein the carrier unit is located outside of the chamber body unit.

8. The gas collecting apparatus of claim 7, wherein the battery delivery unit comprises:
- a gripper configured to grip one of the plurality of jig unit exposed from the battery discharge hole;
- a rotating member having a first end to which the gripper is mounted and extending in a second direction perpendicular to the longitudinal direction; and
- a shaft member which is located between the battery discharge hole and the carrier unit, wherein the carrier unit is located outside of the chamber body unit and extending in the longitudinal direction, and
- wherein the shaft member is coupled to the rotating member, and
- the rotating member is configured to rotates around the shaft member.

9. The gas collecting apparatus of claim 2, wherein the first driving unit comprises:
- a power transmission bar extending in the longitudinal direction and penetrating a second end of the chamber body unit in the longitudinal direction such that a first end of the power transmission bar is inside the chamber body unit;
- a moving member, wherein the carrier unit is coupled to one side of the moving member and the first end of the power transmission bar is coupled to a second side of the moving member;

a first fixing frame to which the chamber body unit is fixed;

a first moving frame to which the power transmission bar is fixed and configured to move linearly in the longitudinal direction based on the first fixing frame;

a shaft screwed into the first moving frame and coupled to the first fixing frame and configured for idling; and an electric motor configured to rotate the shaft.

10. The gas collecting apparatus of claim 9, wherein a sealing cover surrounding the power transmission bar is located inside the chamber body unit, a first end of the sealing cover is fused to the second side of the moving member, and a second end of the sealing cover is fused to an inner wall of the second end of the chamber body unit.

11. The gas collecting apparatus of claim 10, wherein the sealing cover is in a bellows form.

12. The gas collecting apparatus of claim 9, wherein the second driving unit comprises:

a second moving frame to which the first fixing frame is fixed;

a second fixing frame to which the chamber cap unit is fixed; and a pneumatic actuator configured to move the second moving frame in the longitudinal direction based on the second fixing frame.

13. The gas collecting apparatus of claim 2, further comprising:

a pressure sensor unit connected to the gas delivery flow path, wherein the pressure sensor unit is configured to measure a pressure of the battery accommodation area.

14. The gas collecting apparatus of claim 13, further comprising:

a controller configured to control the first driving unit, wherein the controller is controlled based on a pressure value measurement output from the pressure sensor unit.

15. The gas collecting apparatus of claim 14, further comprising:

a manifold located in the gas delivery flow path;

a dilution tank connected to the manifold by a dilution tank flow path;

a vacuum pump connected to the manifold by a vacuum pump flow path;

a first valve configured to open or block a first flow path connecting the manifold and the chamber body unit;

a second valve configured to open or block a second flow path connecting the manifold and the gas analysis unit;

a third valve configured to open or block the dilution tank flow path connecting the manifold and the dilution tank; and a fourth valve configured to open or block the vacuum pump flow path connecting the manifold and the vacuum pump, wherein the controller is configured to control the first valve, the second valve, the third valve, and the fourth valve based on a signal transmitted by the gas analysis unit.

* * * * *